Oct. 2, 1923.
C. E. H. ARMBRUSTER
DYNAMIC PHOROPTOMETER
Filed May 23, 1918
1,469,412
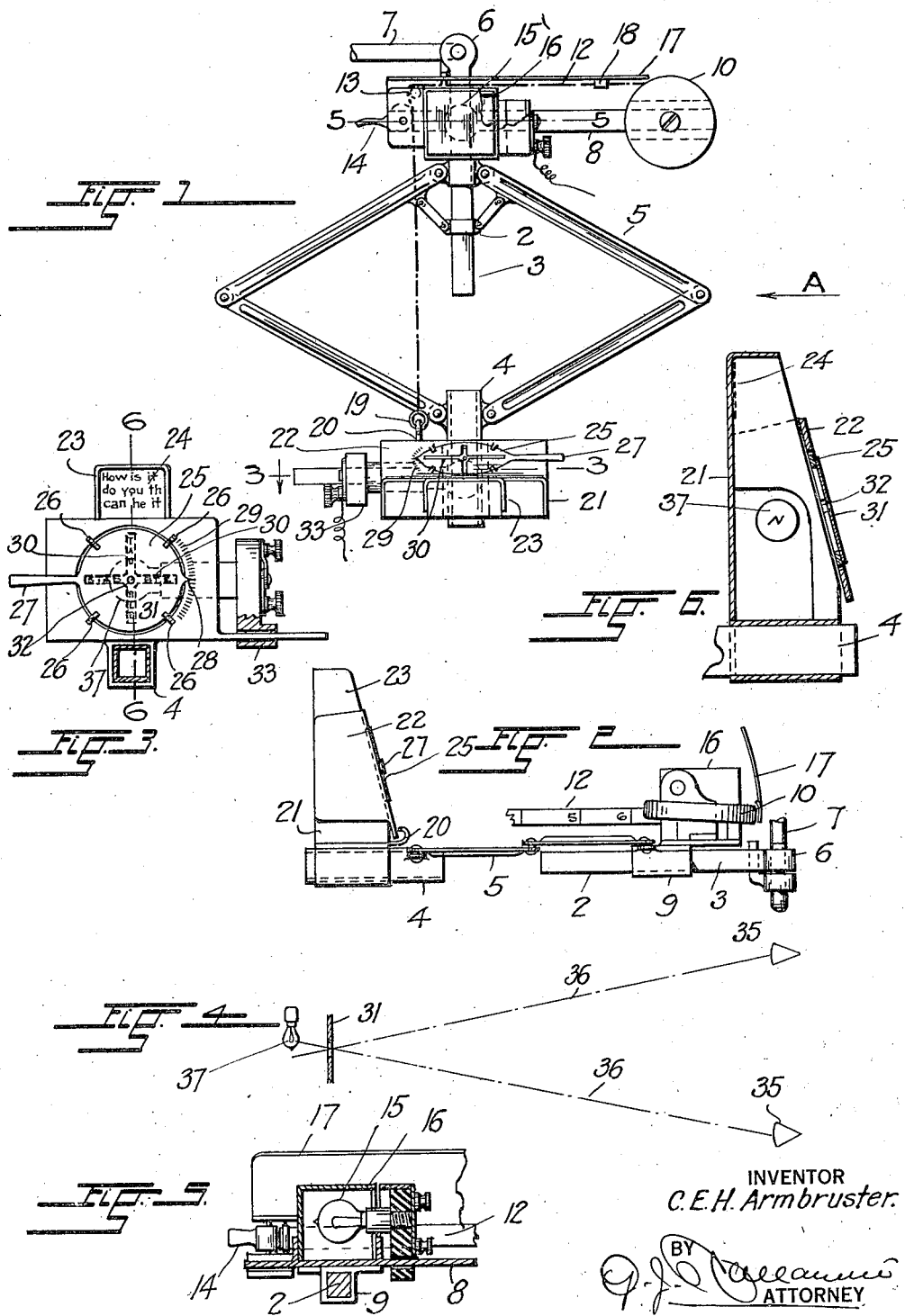
INVENTOR
C.E.H. Armbruster.
BY
ATTORNEY Patented Oct. 2, 1923.

1,469,412

UNITED STATES PATENT OFFICE.

CHARLES E. H. ARMBRUSTER, OF DENVER, COLORADO.

DYNAMIC PHOROPTOMETER.

Application filed May 23, 1918. Serial No. 236,180.

*To all whom it may concern:*

Be it known that I, CHARLES E. H. ARMBRUSTER, a citizen of the United States, residing at Denver, in the county of Denver and State of Colorado, have invented certain new and useful Improvements in Dynamic Phoroptometers, of which the following is a specification.

My invention relates to optical instruments and its primary object is to provide in a single instrument of very simple construction, a phorometer which provides a ready means to correctly test the relative strength of the eye muscles, and an optometer, which is particularly adapted to determine the refractive action of the eyes in skiascopic tests.

In the present method of dynamic retinoscopy, the patient must focus the eyes upon letters which are either attached to the retinoscope or to the forehead of the oculist or are placed upon a stand located to one side of the operator.

Both methods are objectionable for the reason that in the one, the operator cannot separate the retinoscope from the test-type on which the patient's eye is focused in order to find the true focus or point of reversal, while in the other the operator must necessarily look at the eye under examination at an angle to its visual axis and is thereby prevented from ascertaining the refractive errors with the desired accuracy.

It is another object of my invention to eliminate these defective features by providing an instrument of the character mentioned by which the operator is enabled to look into the fovea centralis of the eye focusing upon a test-type, along a line which is very nearly coincident with its line of vision, and to measure the lag or overaccommodation in order to find the true focus or point of reversal, by moving the retinoscope away from the test-type upon which the eye is focused.

The above and other objects, all of which will fully appear in the course of the following description, I attain by certain new and useful combinations and arrangements of devices of novel construction an embodiment of which has been shown in the accompanying drawings in the various views of which like parts are similarly designated, and in which—

Figure 1 represents a plan view of the improved optical instrument,

Figure 2, a side elevation of the same looking in the direction of the arrow A, in Figure 1, Figure 3, a section taken on the line 3—3, Figure 1, Figure 4, a diagrammatic representation of the lines of vision of two eyes of a patient focusing at an illuminated object in the phorometric test, Figure 5, an enlarged section taken along the line 5—5, Figure 1, and Figure 6, an enlarged section on the line 6—6, Figure 3.

The reference character 2 designates a supporting bracket consisting of a bar 3 of angular section, a sleeve 4 fitting upon the same, and a four-armed folding frame 5 by which the bar and sleeve are connected for the linear movement of one with relation to the other.

The bar has at its outer end a socket 6 for the pivotal connection of the bracket with the arm 7 of a trial-frame or other suitable support. A cross-piece 8 fixed upon the bar 2 through the medium of a sleeve 9, carries a spring-urged reel 10 upon which a measuring tape 12 is wound, a roller 13 which guides the tape so that a portion thereof will move transversely of the longitudinal axis of the bar by a movement of the end of the tape in a direction substantially parallel thereto, a clamp 14 which serves to secure the tape in its adjusted position, a pointer 18 which cooperates with the scales on the tape to designate the measured distances, and a small incandescent lamp 15 within a housing 16, which illuminates the part of the tape that registers with the pointer.

A shield 17 provides a support for the pointer 18 and protects the eyes of a patient seated at the end of the instrument, from the glare of the light-rays emitted from the casing in which the lamp is enclosed.

A hook 19 at the free end of the tape is provided to fasten the same to an eye of a retinoscope in the hand of the operator, or a catch 20 on the element of the instrument upon which in practice the eyes are focused and which in its entirety is mounted upon the movable part of the bracket.

The focusing element consists of an upright box 21 which is fixed upon the sleeve 4 and which has an opening facing the end of the bracket at which the patient is positioned.

The lower portion of the opening in the front of the box is covered by a lid 22 which is clamped upon the sides thereof.

The upper part 23 of the box corresponding with the uncovered portion of its opening is reduced in width to permit of the operator throwing a retinoscopic light beam into the eye of a patient focusing upon the opening, along lines which very nearly approach the visual axis thereof.

A test-type 24 is placed upon the inner surface of the box opposite the sight-opening in its reduced upper portion and an incandescent lamp 37 placed within the lower portion of the box illuminates the type so that if it is readily seen by the patient occupying the aforesaid position with relation to the instrument.

The lid 22 which covers the major portion of the open front of the box has a circular opening covered by a disk 25 which is rotatably mounted between lugs 26 fastened upon the face of the lid.

The rotary disk has a handle 27 which facilitates its adjustment, and a pointer 28 which cooperates with an arcuate graduated scale 29 arranged upon the face of the lid in concentric relation to the axis of rotation of the disk. The disk is furthermore provided with two slots 30 which intersect at right angles to each other and which are covered with a sheet 31 of transparent or translucent material.

The sheet has an aperture 32 at the point of intersection of the two slots and it carries in alinement with the latter, lines of letters or other distinctive characters which in the operation promote a desire for focusing the eyes upon one or the other of the slots.

The before-mentioned incandescent lamp 37 is fastened upon a slide 33 which is mounted upon a lateral extension of the lid 22 and which extends through an opening in a side of the box.

The lamp thus mounted is arranged to move in a horizontal plane passing through the point of intersection of the slots in the rotary disk so that it may be brought in the line of vision of either eye of a patient focusing upon the opening in the transparent sheet.

In the operation of the instrument, the patient faces the front of the test-type box at which he looks through lenses in a trial frame which may be worn by the patient or fastened upon the support 7. While the patient focuses the eye upon the artificially illuminated test-type the operator moves the sleeve upon which the box is supported, toward or from the relatively fixed bar until the approximate focusing point is found. The operator examines the focusing eye by looking through a retinoscope along a line which passes close to the reduced upper portion of the box and is sufficiently near to the line of vision of the eye to enable the operator to determine the refractive errors of the eye with absolute accuracy.

The tape whose end is fastened either to the moving sleeve or to the retinoscope in the hand of the operator, measures the distance between the patient and the test-type in its adjusted position.

In order to find the true focusing point of the eye under examination, the operator measures the lag or overaccommodation of the eye by moving the retinoscope to which the tape is attached, away from the test-type and noting the distance from the eye of the patient at which the true focus or point of reversal is established.

It will be noted that the absence of any projecting parts rearward of the test-object, permits of the operator looking through the retinoscope at a point which is very close to the test-type, and, by reason of the restricted width thereof, very near the line of vision of an eye which focuses upon the type.

In the use of the instrument as a phorometer for testing the relative strength of the eye muscles, the patient focuses upon the aperture at the point of intersection of the illuminated slots by reading the letters or other characters upon the portion of the transparent sheet placed over the same.

The electric lamp 37 is shifted until it is within the line of vision of the eye under examination and concealed from the other eye, as illustrated diagrammatically in Figure 4 of the drawings in which the reference numerals 35 designate the eyes of a patient, and 36 the lines of vision passing through the aperture at the center of the illuminated cross in the front of the test-box.

In testing the muscle-balance by the use of my improved instrument, a cylindrical lens, commonly known as a "Maddox rod," is placed before the eye under examination.

Should the vertical muscles of the eye be balanced the streak of light produced by the Maddox rod will pass through the aperture at the point of intersection of the slots in the disk 25 and directly through the horizontal line of print, and any deviation from this ideal condition indicates an imbalance of the muscles, the extent of which is measured by placing prisms before the eye under test, until the two streaks of light (that produced by the Maddox rod, and that appearing through the horizontal slot in the test-box) coincide.

The strength of the horizontal muscles of the eye are tested in a similar manner by ascertaining the position of the Maddox rod relative to the vertical line of print in the front of the test box.

A circular imbalance or weakness of the oblique eye-muscles is measured on the scale by turning the disk about its pivot until the line of light seen through the Maddox rod before the patient's eye coincides with either of the intersecting slots.

It will be understood that the correct distance between the test-box and the eye at which the muscle test is conducted is that at which the eye focuses upon the test-type in the upper part of the box or those appearing on the illuminated slots of the disk.

Having thus described my invention what I claim and desire to secure by Letters-Patent is:

1. In an instrument of the character described, the combination of a rectilinearly extensible and contractible bracket supported at one of its ends, a reel adjacent the fixed end of the bracket, a test-object adjacent the opposite end of the same, a measuring-tape wound on the reel for measuring the distances between the fixed end of the bracket and the test-object, said tape extending partially transverse to the line of movement of the bracket, and a pointer cooperating with said transverse portion of the tape.

2. In an instrument of the character described, the combination of a rectilinearly extensible and contractible bracket supported at one of its ends, a reel adjacent the fixed end of the bracket, a test-object adjacent the opposite end of the same, a measuring tape wound on the reel for measuring the distances between the fixed end of the bracket and the test-object, said tape extending partially transverse to the line of movement of the bracket, a pointer cooperating with said transverse portion of the tape, and a lamp-casing on the bracket having an opening for the emission of light onto the portion of the type which registers with the pointer.

3. In an instrument of the character described, the combination of a rectilinearly extensible and contractible bracket supported at one of its ends, a reel adjacent the fixed end of the bracket, a test-object adjacent the opposite end of the same, a measuring-tape wound on the reel for measuring the distances between the fixed end of the bracket and the test-object, said tape extending partially transverse to the line of movement of the bracket, a pointer cooperating with said transverse portion of the tape, and a clamp adapted to secure the tape in its adjusted positions.

4. In an instrument of the character described, the combination of a support composed of a fixed member and a member having a rectilinear movement with relation thereto, a test object carried on the movable member, a reel on the fixed member, and a measuring tape on the reel extending transversely and thence longitudinally of the line of movement of the movable member and connected with said test object for measuring the distance of the latter from a determinate point on the support.

5. In an instrument of the character described, the combination of a support composed of two members and a folding frame comprising toggle levers connecting the said members and arranged to permit of only a rectilinear movement of one of said members relative to the other, and a test-object carried on said movable member.

6. In an instrument of the character described, the combination of a support composed of two members adapted to slide one upon the other, and a folding frame comprising toggle levers connected to the said members and arranged to permit of only a rectilinear movement of one of said members with relation to the other, and a test-object carried on said movable member.

7. In an instrument of the character described, a phorometer provided with an object surface having a slot, and including an apertured transparent covering for the slot, and a lamp behind said surface, having an adjustment in the horizontal plane of the axis of the aperture in the covering to arrange the light in the line of vision of one eye and carry it out of the line of the vision of the other eye.

8. In an instrument of the character described, a phorometer provided with an object surface having intersecting slots and including a transparent covering for said slots having an aperture at their point of intersection, and a lamp behind the surface having an adjustment in the horizontal plane of the axis of said aperture.

9. In an instrument of the character described, a phorometer provided with a rotary surface having a transparent focusing-slot and an open aperture in its center of rotation, and a lamp behind said surface in the horizontal plane of the axis of said aperture.

10. In an instrument of the character described, a phorometer provided with a rotary surface having transparent slots intersecting its center of rotation and an open aperture at their point of intersection, and a lamp behind the surface in the horizontal plane of the axis of said aperture.

11. In an instrument of the character described a phorometer provided with an object surface having two slots at right angles to each other, and mounted to be in the line of vision of a distant patient, and a lamp behind said surface to illuminate its slots, and movable beyond the visual axis of one of the eyes.

12. In an instrument of the character described a phorometer provided with an object surface having a slot and a row of test-types partially covering the same, and a lamp behind the surface to illuminate the slot, and movable beyond the visual axis of one of the eyes.

13. In an instrument of the character described a phorometer provided with an object surface having two slots at right angles to each other and rows of test-types partially covering the same, and a lamp behind the surface to illuminate its slots, and movable beyond the visual axis of one of the eyes.

14. A phorometer provided with an object surface having intersecting translucent slots and an open hole at the point of intersection, and a lamp behind the surface in the horizontal plane of the axis of the hole adjusted to lie beyond the visual axis of one of the eyes.

15. In an instrument of the character described, a focusing element comprising a box having a partially covered front, provided with an aperture in the closed portion thereof, a lamp behind said portion, and a test-type in the box opposite the open portion of its front.

16. In an instrument of the character described, a focusing element comprising a box having a partially covered front, provided with an aperture in the closed portion thereof, a lamp behind said portion, a test-type in the box opposite the open portion of its front, and a lid for covering said open portion.

17. In an instrument of the character described a focusing element comprising a box having an aperture in its front, and a lamp in the box, adjustable in a horizontal plane passing through the axis of the aperture to arrange a lamp in the line of vision of one eye and carry it out of the line of vision of the other eye.

18. In an instrument of the character described a focusing element comprising a box, a rotary plate covering an opening in the front thereof, and having an aperture in its center of rotation, and a lamp in the box opposite said aperture, the plate and a relatively stationary part of the box having a scale and a pointer which cooperate to indicate the angles of rotation of the plate.

19. In a device of the class described, a casing provided with an apertured portion forming a restricted opening therein, a lamp mounted within said casing, said apertured portion and lamp being relatively movable with respect to one another to arrange the lamp in the line of vision of one eye and out of the line of vision of the other eye.

20. In a device of the class described, a casing provided with a restricted opening in one wall thereof, and a lamp within said casing movable with respect to the axis of said opening to arrange the lamp in the line of vision of one eye and out of the line of vision of the other eye.

21. In a device of the class described, a casing having a restricted opening in one wall thereof, and a lamp within said casing and movable horizontally therein to various positions with respect to the axis of said opening to arrange the lamp in the line of vision of one eye and out of the line of vision of the other eye.

22. In a device of the class described having one wall thereof partially closed and the closed portion provided with a restricted opening, a lamp within said casing, said lamp and closed portion being movable with respect to one another to arrange the lamp in the line of vision of one eye and out of the line of vision of the other eye, and a test type chart within said casing observed from the unclosed portion of said casing.

23. In a device of the class described, a casing having one wall thereof partially closed and provided with a restricted opening, a test type chart arranged in said casing for observation through the unclosed portion of said casing, and a lamp mounted within said casing movable horizontally therewithin and cooperating with the aforesaid restricted opening to arrange the lamp in the line of vision of one eye and out of the line of vision of the other eye.

In testimony whereof I have affixed my signature.

CHARLES E. H. ARMBRUSTER.